(12) United States Patent
Zhang et al.

(10) Patent No.: US 8,253,375 B2
(45) Date of Patent: Aug. 28, 2012

(54) BATTERY CHARGER WITH RETRACTABLE CONTACTS

(75) Inventors: Shuai Zhang, Shenzhen (CN); Yan-Yan Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 291 days.

(21) Appl. No.: 12/796,641

(22) Filed: Jun. 8, 2010

(65) Prior Publication Data

US 2011/0050161 A1 Mar. 3, 2011

(30) Foreign Application Priority Data

Aug. 31, 2009 (CN) .......................... 2009 1 0306385

(51) Int. Cl.
*H02J 7/00* (2006.01)
(52) U.S. Cl. ......... 320/107; 320/113; 320/114; 320/115
(58) Field of Classification Search ................... 320/107
See application file for complete search history.

(56) References Cited

U.S. PATENT DOCUMENTS

| | | | | |
|---|---|---|---|---|
| 5,738,954 A | * | 4/1998 | Latella et al. | 429/97 |
| 2009/0315501 A1 | * | 12/2009 | Li et al. | 318/568.12 |
| 2010/0085007 A1 | * | 4/2010 | Shu | 320/107 |

* cited by examiner

*Primary Examiner* — M'Baye Diao
(74) *Attorney, Agent, or Firm* — Altis Law Group, Inc.

(57) ABSTRACT

A battery charger includes a bottom case comprising a bottom surface. A cover is attached on the case defining a curved groove and two openings. A seat is fixed on the bottom surface and comprises a first inclined surface inclined relative to the bottom surface. A slider is slidably arranged in the case and comprises two spring contacts aligned with the two openings, respectively. The slider is slidable to a position where the spring contacts protrude out of the two openings. The driving member is arranged in the bottom case and includes a post protruding out of the curved groove. A mating member comprises a second inclined surface inclined relative to the bottom surface engaging the first inclined surface. A first means is for allowing the mating member to slidably connect the mating member to the driving member and allowing the mating member to rotate together with the driving member.

17 Claims, 6 Drawing Sheets

BATTERY CHARGER WITH RETRACTABLE CONTACTS

BACKGROUND

1. Technical Field

The present disclosure relates to battery chargers and, more particularly, to a cell phone charger having retractable contacts.

2. Description of Related Art

A cell phone battery charger often includes spring contacts external to its housing, such as the charger disclosed by U.S. Pat. No. 5,686,808. To charge a battery, the charger can be first connected to a power source, and then the battery is placed on the charger. The external contacts may be short-circuited when small conductive objects falling on them, which thus may damage the charger or the battery.

BRIEF DESCRIPTION OF THE DRAWINGS

The components in the drawings are not necessarily drawn to scale, the emphasis instead being placed upon clearly illustrating the principles of the cell phone battery charger. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
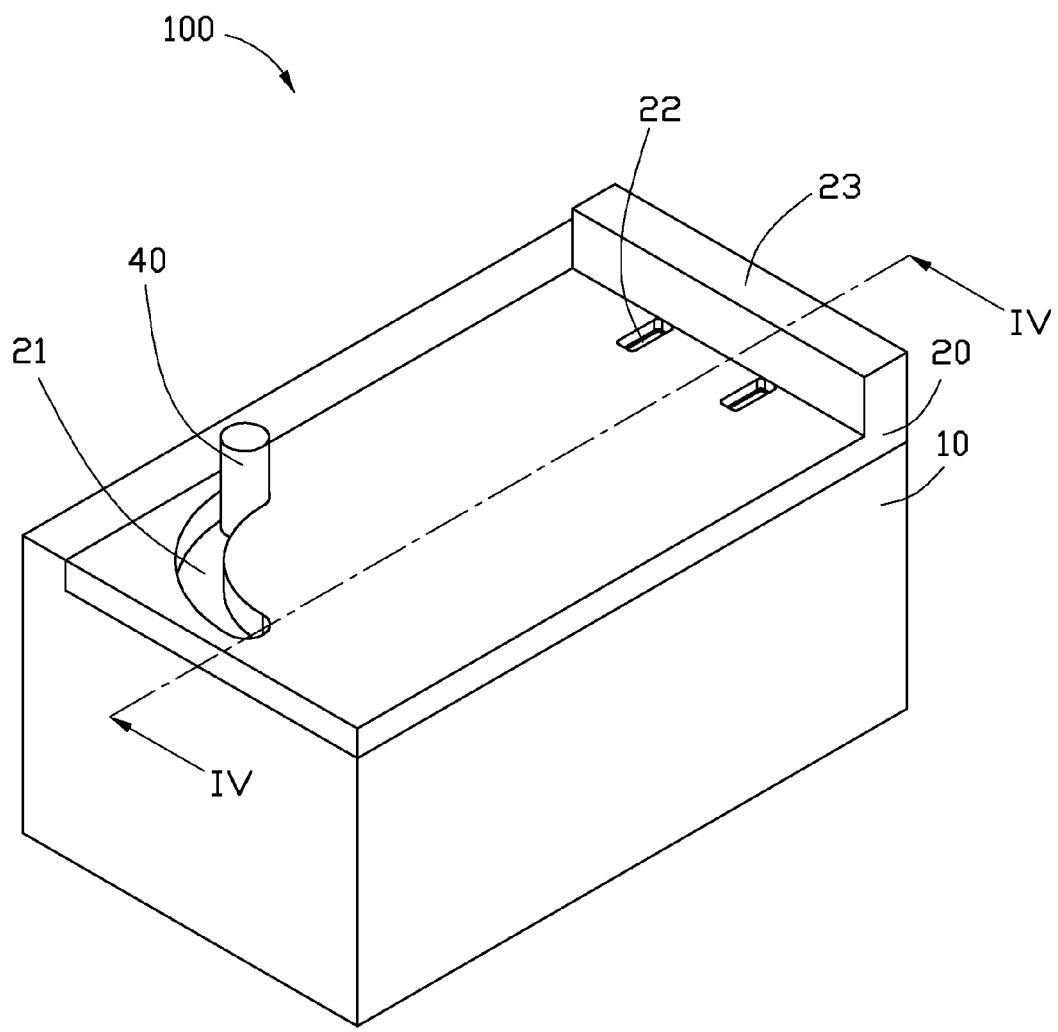
FIG. 1 is an isometric view of a cell phone battery charger in accordance with an exemplary embodiment.
Figure 2:
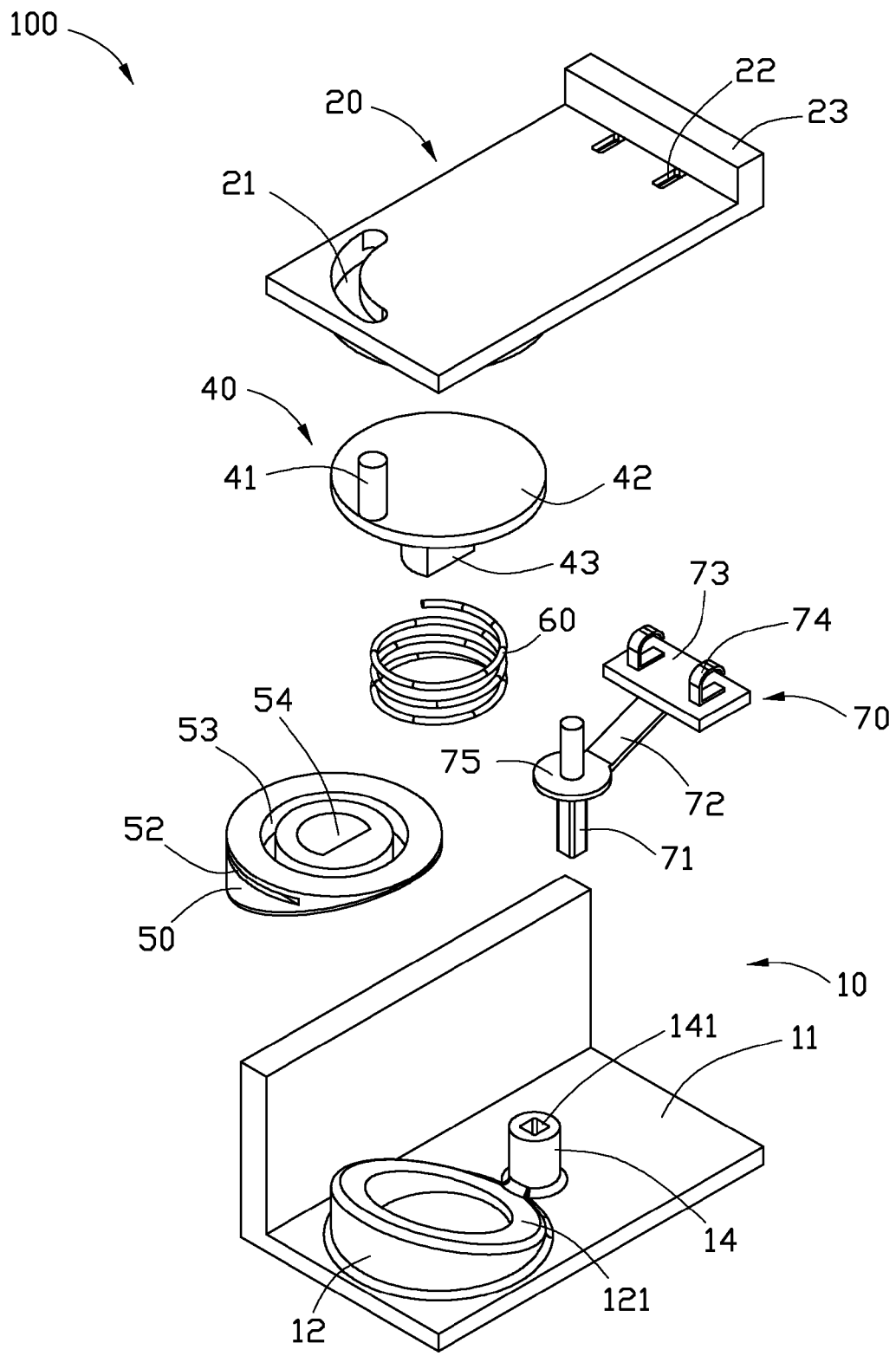
FIG. 2 is an isometric, exploded view of the charger of FIG. 1, with certain sides omitted for clarity.
Figure 3:
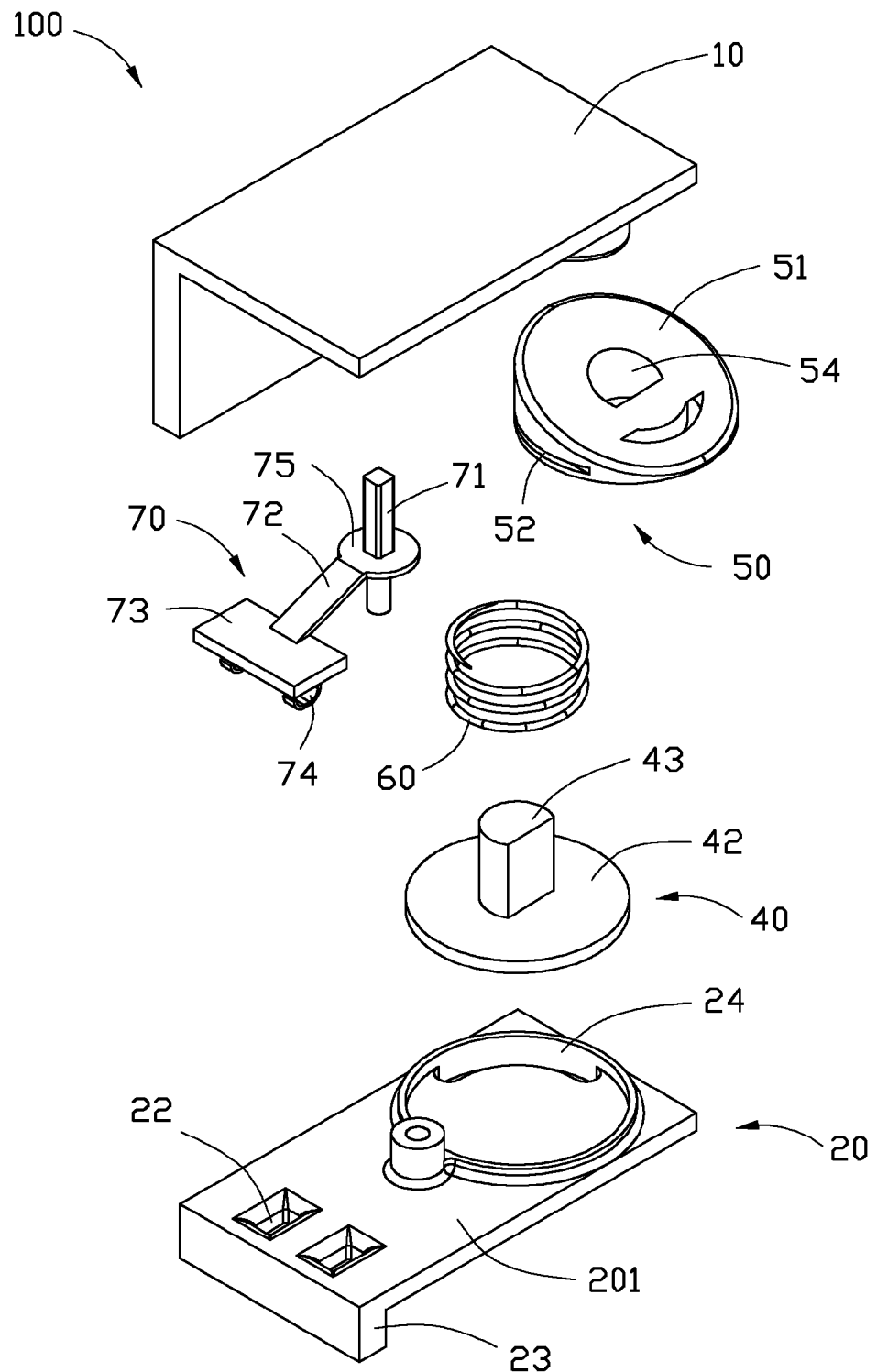
FIG. 3 is another isometric, exploded view of the charger of FIG. 1 viewed from another perspective.

Referring to FIGS. 1-3, a charger 100 includes a bottom case 10 and a cover 20. The case 10 is hollow and includes a bottom surface 11. A seat 12 is formed on the bottom surface 11 and is substantially round in shape. The seat 12 includes a top, inclined surface 121 inclined relative to the bottom surface 11. A rod receiver 14 protrudes from the bottom surface 11 and defines an axial non-circular hole 141. In the embodiment, the hole 141 is substantially rectangular.

The cover 20 is fixed to the case 10 and defines a curved groove 21 near one end of the cover 20 and a protruding wall 23 on the opposite end. Two openings 22 are formed in the cover 20 adjacent to the wall 23. On an inner side 201 of the cover 20 facing the bottom surface 11, a ring portion 24 is formed. In the embodiment, the ring portion 24 is substantially concentric with the curved groove 21.

The charger 100 also includes a driving member 40, a mating member 50, and an elastic member 60 between the driving member 40 and the mating member 50. The driving member 40 includes a round disk 42 and a post 41 protruding from a top surface of the round disk 42. A non-circular shaft 43 is formed on the bottom surface of the round disk 42. The round disk 42 is received in and orientated by the ring portion 24, and can thus rotate relative to the cover 20. The round disk 42 is driven by the elastic member 60 to abut against the cover 20, causing the post 41 to protrude out of the curved groove 21. As the post 41 moves along the curved groove 21, the round disk 42 rotates within the ring portion 24.

The mating member 50 is similar to the seat 12 in shape. Specifically, the mating member 50 includes a bottom, inclined surface 51. The inclined surface 51 can abut against the inclined surface 121. A groove 52 is formed in the mating member 50 and extends almost completely around the periphery of the mating member 50. A non-circular hole 54 is formed in a substantially central position of the inclined surface 51. An annular recess 53 is formed in the mating member 50 around the non-circular hole 54.

Figure 4:
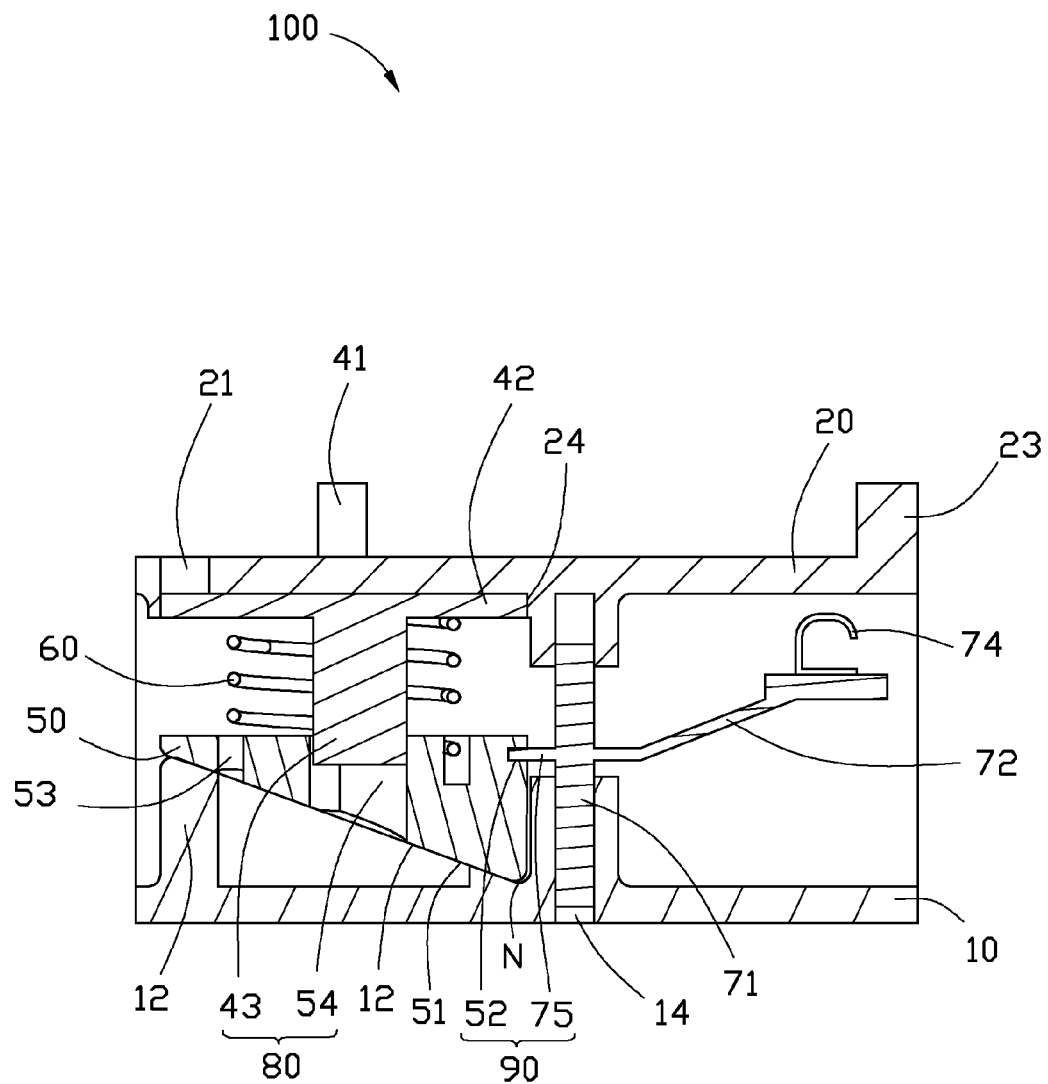
FIG. 4 is a cross-sectional view of the charger of FIG. 1, taken along line IV-IV of FIG. 1.

Referring to FIG. 4, one end of the non-circular shaft 43 fits into the non-circular hole 54, constituting a first means 80 for allowing the mating member 50 to rotate together with the driving member 40, and allowing the mating member 50 to slide along the shaft 43. The elastic member 60 is used to apply a spring pushing force to the driving member 40 and the mating member 50. In the embodiment, one end of the elastic member 60 is received in the annular recess 53, and the other end abuts against the round disk 42. The elastic member 60 can be a coil spring.

Referring again to FIG. 2, the charger 100 further includes a slider 70 that includes a rod 71 and a cantilevered arm 72 extending from the rod 71. A supporting plate 73 is formed at one end of the arm 72 for fixing two spring contacts 74 that are aligned with the two openings 22, respectively. In the embodiment, the rod 71 has a substantially rectangular cross section and can be slidably inserted into the hole 141 of the rod receiver 14. A round tab 75 extends radially outward from the rod 71 cooperates with the groove 52 to constitute a second means 90 (FIG. 4) for allowing the slider 70 to move together with the mating member 50. In the embodiment, the round tab 75 has a thickness slightly smaller than the height of the groove 52, such that part of the tab 75 can be movably received in the groove 52.

Figure 5:
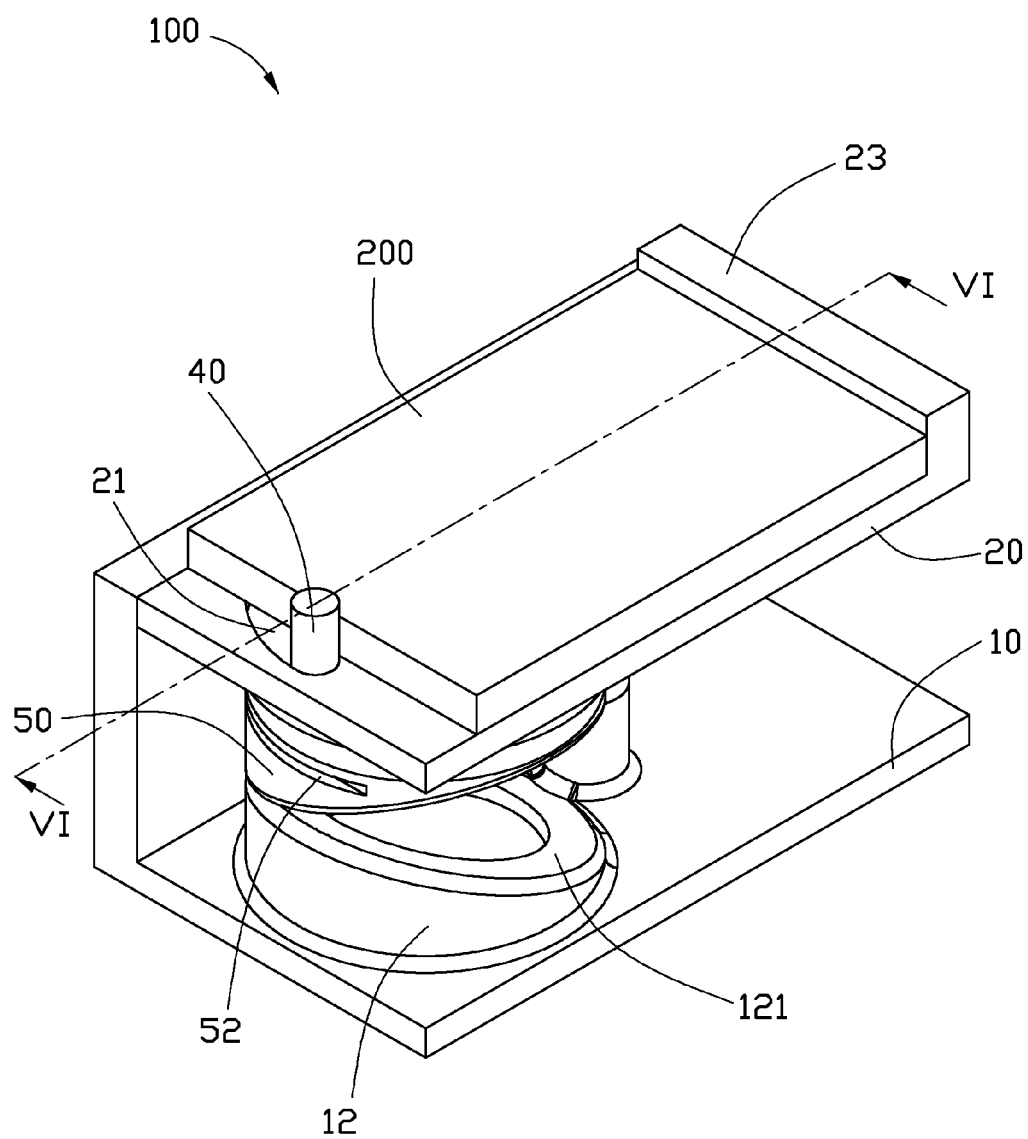
FIG. 5 shows that a battery is placed on the charger of FIG. 1.
Figure 6:
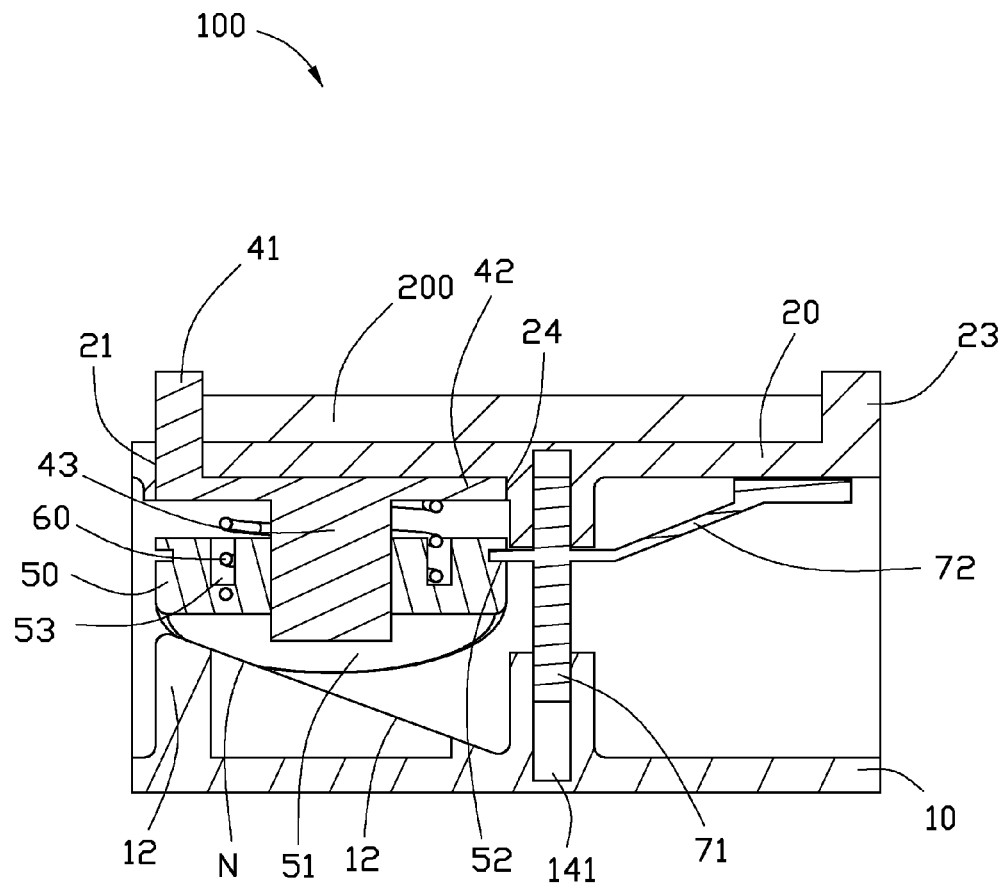
FIG. 6 is a cross-sectional view of the charger and battery of FIG. 5, taken along line VI-VI of FIG. 5.

Normally, the contacts 74 stay within the case 10 as shown in FIG. 4. Referring to FIGS. 5-6, when in use, the post 41 is moved along the groove 21 of the cover 20, causing the round disk 42 to rotate. The mating member 50 thus rotates together with the shaft 43, causing a contacting point N on the periphery of the inclined surface 51 moves against the inclined surface 121. Because of the inclined surface 121, the mating member 50 slides along the shaft 43 as the contacting point N moves, causing the slider 70 to move toward the cover 20. After the contacting point N moves from a lower position to a higher position, the slider 70 moves to a position where the contacts 74 protrude out of the two openings 22. A battery 200 can thus be placed on the cover 20 to be charged.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A battery charger comprising:
   a bottom case comprising a bottom surface;
   a cover attached on the case and defining a curved groove and two openings extending therethrough;
   a seat fixed on a bottom surface of the case and comprising a first inclined surface inclined relative to the bottom surface;
   a slider slidably arranged in the bottom case and comprising two spring contacts aligned with the two openings, respectively, the slider being slidable to a position where the spring contacts protrude out of the two openings;

a driving member arranged in the bottom case and comprising a post protruding out of the curved groove;
a mating member comprising a second inclined surface inclined relative to the bottom surface and engaging the first inclined surface;
a first means for allowing the mating member to slidably connect the mating member to the driving member and allowing the mating member to rotate together with the driving member; and
a second means for allowing the slider to move together with the mating member;
wherein, the mating member rotates as the post moves along the curved groove, causing the second inclined surface of the mating member to move against the first inclined surface from a lower position to a higher position, which further causes the spring contacts to protrude out of the two openings.

2. The battery charger according to claim 1 further comprising an elastic member between the driving member and the mating member to apply a spring pushing force to the driving member and the mating member.

3. The battery charger according to claim 2, wherein the elastic member is a coil spring.

4. The battery charger according to claim 1, wherein the driving member comprises a round disk, from which the post protrudes, the cover comprises a ring portion to orientate the round disk, allowing the round disk to rotate relative to the cover as the post moves along the groove.

5. The battery charger according to claim 4, wherein the first means comprises a non-circular shaft formed on the round disk, and a non-circular hole defined in the mating member, one end of the non-circular shaft fits into the non-circular hole.

6. The battery charger according to claim 1, wherein the slider comprises a rod and a cantilevered arm extending from the rod, the bottom case comprises a rod receiver protruding from the bottom surface and defining a hole, the rod is slidably received in the hole.

7. The battery charger according to claim 6, wherein the second means comprises a receiving groove extending around the mating member, and a tab protruding from the rod, part of the tab is movably received in the groove.

8. The battery charger according to claim 6, wherein the rod has a non-circular cross section.

9. The battery charger according to claim 4, wherein the curved groove is concentric with the ring portion.

10. A battery charger, comprising:
a case defining at least one through hole, and a curved through groove;
a cover attached on the case and defining a curved groove and two openings extending therethrough;
at least one contact movably mounted inside the case and positioned aligning with the at least one through hole;
a seat fixed inside the case and having a first inclined surface corresponding to the curved through groove;
a mating member comprising an engaging part engaging the first inclined surface;
a driving member rotatably arranged inside the case and comprising a post protruding out of the curved groove, the driving member to drive the mating member to rotate relative to the first inclined surface via the rotation of the post; and
a slider slidably arranged inside the case, and slidably engaging the mating member such that when the mating member rotates relative to the first inclined surface, the slider is pushed to move by the mating member and causes the at least one contact to move out of or retract from the at least one through hole.

11. The battery charger according to claim 10, wherein the engaging part of the mating member is a second inclined surface.

12. The battery charger according to claim 10 further comprising an elastic member between the driving member and the mating member to apply a spring pushing force to the driving member and the mating member.

13. The battery charger according to claim 12, wherein the elastic member is a coil spring.

14. The battery charger according to claim 10, wherein the driving member comprises a round disk, from which the post protrudes, the cover comprises a ring portion to orientate the round disk, allowing the round disk to rotate relative to the cover as the post moves along the groove.

15. The battery charger according to claim 14, wherein the round disk includes a non-circular shaft protruding therefrom, a non-circular hole is defined in the mating member, one end of the non-circular shaft fits into the non-circular hole to allow the mating member to slidably connect the mating member to the driving member and allow the mating member to rotate together with the driving member.

16. The battery charger according to claim 10, wherein the slider comprises a rod and a cantilevered arm extending from the rod, a bottom surface of the case comprises a rod receiver protruding from the bottom surface and defining a hole, the rod is slidably received in the hole.

17. The battery charger according to claim 16, wherein a receiving groove is formed in and extends around the mating member, a tab protrudes from the rod, part of the tab is movably received in the groove to allow the slider to move together with the mating member.

* * * * *